(12) United States Patent
Yamashita et al.

(10) Patent No.: US 8,134,608 B2
(45) Date of Patent: Mar. 13, 2012

(54) IMAGING APPARATUS

(75) Inventors: Tatsumaro Yamashita, Miyagi-ken (JP); Tomoya Kamata, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 653 days.

(21) Appl. No.: 12/258,792

(22) Filed: Oct. 27, 2008

(65) Prior Publication Data

US 2009/0128686 A1    May 21, 2009

(30) Foreign Application Priority Data

Nov. 19, 2007   (JP) ................................. 2007-298854

(51) Int. Cl.
*H04N 5/228* (2006.01)
*H04N 9/47* (2006.01)
*H04N 7/18* (2006.01)

(52) U.S. Cl. ..................... 348/222.1; 348/148; 348/63

(58) Field of Classification Search ............. 348/207.99, 348/222.1, 223.1, 148, 157, 159, 211.12, 348/221.1, 63, 255, 240.99, 240.1
See application file for complete search history.

(56) References Cited

U.S. PATENT DOCUMENTS

| | | | |
|---|---|---|---|
| 5,185,667 A * | 2/1993 | Zimmermann | 348/207.99 |
| RE36,207 E * | 5/1999 | Zimmermann et al. | 348/207.99 |
| 6,005,611 A * | 12/1999 | Gullichsen et al. | 348/211.6 |
| 6,833,843 B2 * | 12/2004 | Mojaver et al. | 345/647 |
| 2003/0103063 A1 * | 6/2003 | Mojaver et al. | 345/647 |

FOREIGN PATENT DOCUMENTS

| | | |
|---|---|---|
| EP | 1 580 0986 A2 | 9/2005 |
| JP | 09-048282 | 2/1997 |
| JP | 2000-324386 | 11/2000 |
| JP | 3300334 | 4/2002 |
| JP | 2004-040411 | 2/2004 |

OTHER PUBLICATIONS

Basu, Anup et al., "Modeling Fish-Eye Lenses" Intelligent Robots and Systems '93, IROS '93. Proceedings of the 1993 IEIEE/RSJ International Conference on Yokohama, Japan Jul. 26-30, 1993, New York, NY, USA, IEEE, US vol. 3, Jul. 26, 1993; pp. 1822-1828 XP010219209 ISBN: 978-0-7803-0823-7.

European Search Report issued in corresponding European Patent Application No. 08 01 9000; mailed Feb. 13, 2009.

* cited by examiner

*Primary Examiner* — David Ometz
*Assistant Examiner* — Ahmed A Berhan
(74) *Attorney, Agent, or Firm* — Brinks Hofer Gilson & Lione

(57) ABSTRACT

Disclosed is an imaging apparatus capable of enlarging a portion of an image captured by an imaging device of a fisheye camera and displaying the enlarged image on a display screen with little distortion. The imaging apparatus enlarges a section, which is a portion of an image captured by a fisheye camera, and displays the section on a display screen such that the enlargement ratios of points in the section are different from each other. An image processing method uses a change function that changes the enlargement ratio of a field angle depending on the place is used, and converts a portion of the captured image into a central projection image to generate a display image. The use of the change function makes it possible to generate a display image having high visibility.

11 Claims, 6 Drawing Sheets

FIG. 10
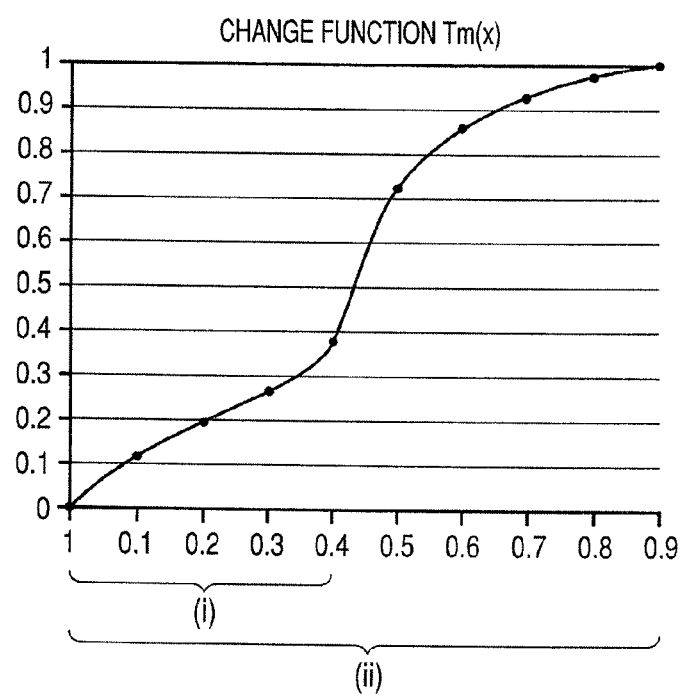
FIG. 11A   FIG. 11B   FIG. 11C
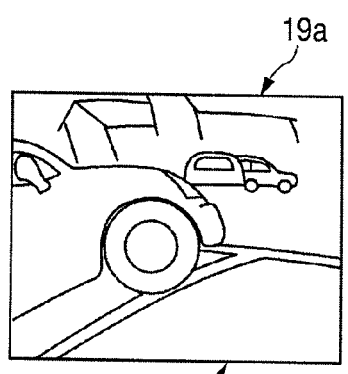
130A
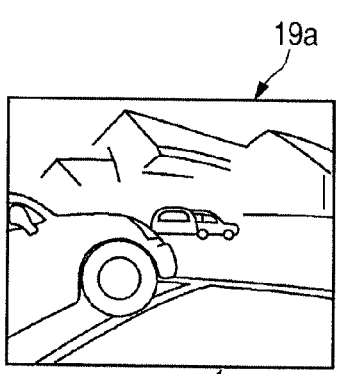
130B
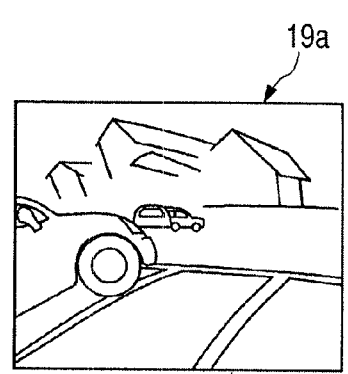
130C

IMAGING APPARATUS

CLAIM OF PRIORITY

This application claims benefit of the Japanese Patent Application No. 2007-298854 filed on Nov. 19, 2007, the entire content of which is hereby incorporated by reference.

BACKGROUND

1. Technical Field

The present invention relates to an imaging apparatus that uses an imaging device to detect light focused by various types of lenses, such as a fisheye lens and a wide-angle lens, enlarges some of image signals detected by the imaging device, corrects distortion, and displays an image on a display screen.

2. Related Art

An imaging apparatus that uses a camera including a fisheye lens or an optical lens and an imaging device to capture an external image and displays the image on a display device has been used for security or vehicles. In particular, in an imaging apparatus for a vehicle, a camera is attached to the body of the vehicle and captures an external image in the wide range. However, the distortion of an image detected by an imaging device of a camera using a fisheye lens or a wide-angle lens is increased as a field angle from the optical axis of the lens is increased.

Therefore, JP-A-2000-324386 discloses a technique that calculates the distortion of an image captured by a camera and corrects the distortion of the image. However, JP-A-2000-324386 does not disclose a method of calculating the distortion. Since the image captured by the camera using the fisheye lens or the wide-angle lens has a three-dimensional depth, a three-dimensional geometric process is needed to calculate the distortion of the image, which results in an increase in the amount of computation. In addition, a large load is applied to a CPU in order to continuously calculate the distortion of the image captured by the camera using the fisheye lens or the wide-angle lens.

JP-A-2004-40411 discloses a display system which includes a conversion table that corrects the distortion of a curved image and uses the conversion table to convert the curved image captured by a camera into display data.

However, in this method, the conversion table corresponds to only a section having a predetermined size that is disposed at a predetermined position of the image captured by the camera. Therefore, when a plurality of sections is extracted from the image captured by the camera and then displayed on a display device, it is necessary to prepare the conversion table for each of the sections. That is, since the conversion table corresponds to a predetermined region of the image captured by the camera, the conversion table has low compatibility. For example, when the angle at which the camera is attached deviates from the original position and the actual image is different from the image of a predetermined section in the conversion table, it is difficult to exactly correct the captured image.

Japanese Patent No. 3300334 discloses a technique in which a matching table corresponding to a display region is prepared in advance, and pixels of images captured by a plurality of cameras are displayed to correspond to predetermined coordinates in the matching table. Similar to the disclosure of JP-A-2004-40411, the arrangement disclosed in Japanese Patent No. 3300334 can correct only the distortion of an image in a predetermined section.

In addition, since the corrected image is subjected to plane development, the overall field angle of the image is decreased.

SUMMARY

According to an aspect of the invention, an imaging apparatus includes: a lens; an imaging device that detects light focused by the lens at a plurality of detection points; and an image processing unit that generates image data for displaying an image on a display screen having a predetermined area, on the basis of image signals detected at the detection points of the imaging device. The image processing unit performs image processing to enlarge a section, which is a portion of the image captured by the imaging device, and display the enlarged image on the display screen, and in the image processing, the enlargement ratio of a field angle varies depending on the place in the section.

The imaging apparatus according to the above-mentioned aspect of the invention extracts a portion of the image captured by an imaging device of a camera using, for example, a fisheye lens or a wide-angle lens, and changes the enlargement ratio of the field angle of the extracted image depending on the place, thereby enlarging a portion of the captured image and reducing the other portions. In this way, it is possible to display an image with little distortion on a display screen.

The enlargement ratio of the field angle of a portion of the image is calculated from a change function. Therefore, it is possible to correct the distortion of a captured image with a minimum amount of computation.

A portion of the image captured by the imaging device of the camera is converted into a central projection image, and then the pixels of the display screen correspond to the detection points of the imaging device. Therefore, it is possible to accurately correct the distortion of a portion of the captured image with a simple operation and display the corrected image on the display screen.

As a result, according to the above-mentioned aspect of the invention, it is possible to reduce the distortion of an image and obtain a wide-angle display image by enlarging an interest region of the image detected by a lens, such as a fisheye lens or a wide-angle lens, and reducing the other regions.

BRIEF DESCRIPTION OF THE DRAWINGS

FIG. 10 is a diagram illustrating a combination of the change functions having different enlargement ratios; and FIGS. 11A, 11B, and 11C are diagrams illustrating images displayed on a display screen at different enlargement ratios.

DESCRIPTION OF EXEMPLARY EMBODIMENTS

Figure 1:
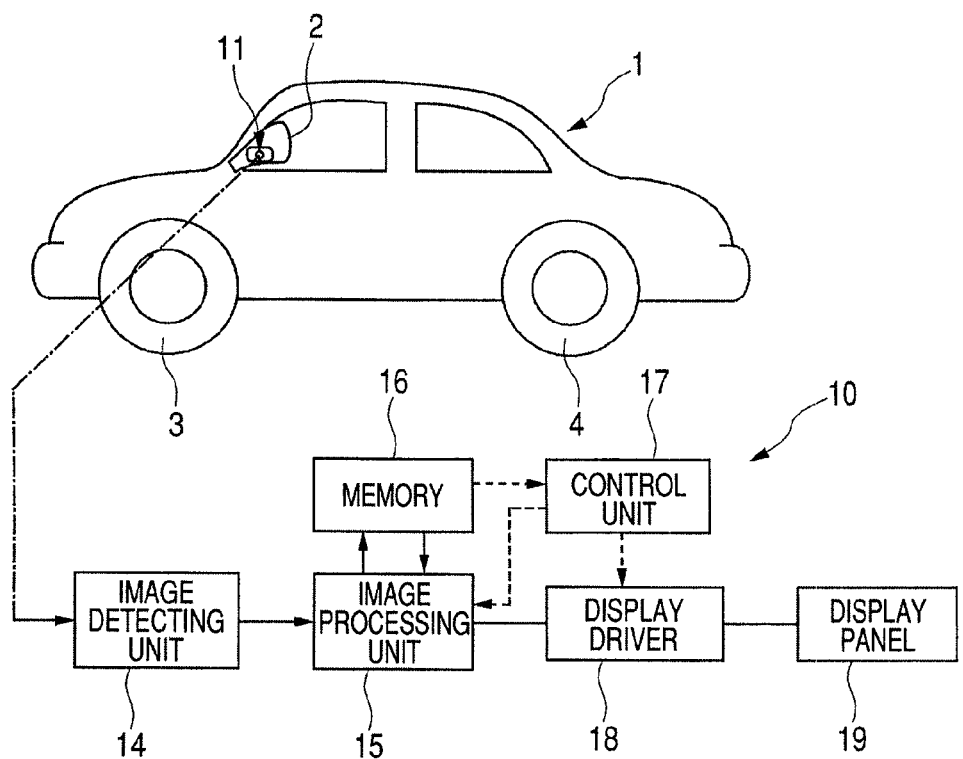
FIG. 1 is a block diagram illustrating an imaging apparatus according to an embodiment of the invention.

FIG. 1 is a block diagram illustrating an imaging apparatus according to an embodiment of the invention.

An imaging apparatus 10 includes a fisheye camera 11. For example, the fisheye camera 11 is attached to the body of a vehicle 1. In the embodiment shown in FIG. 1, the fisheye camera 11 is mounted to a fender mirror 2 of the vehicle 1, and the optical axis of the fisheye camera is positioned between a front wheel 3 and a rear wheel 4. The optical axis is aligned in the vertical direction of the plane of FIG. 1 and is inclined downward at an angel of about 45° with respect to the other surface.

Figures 2A, 2B:
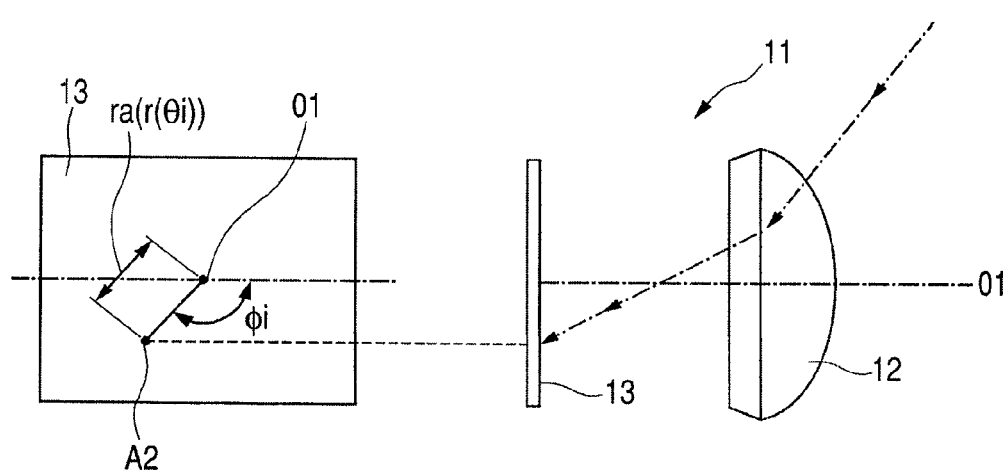
FIG. 2A is a side view illustrating a fisheye lens and an imaging device.
FIG. 2B is a front view illustrating the imaging device.

As shown in FIG. 2A, the fisheye camera 11 includes a fisheye lens 12 and an imaging device 13 having a plurality of detection points that detect light focused by the fisheye lens 12. The imaging device 13 is, for example, a CCD or a CMOS.

Image signals (brightness signals) detected at the detection points of the imaging device 13 are converted into digital image signals by an image detecting unit 14, and then transmitted to an image processing unit 15. A memory 16, serving as a storage unit, is attached to the image processing unit 15, and the image processing unit 15 and the memory 16 are controlled by a control unit 17. The image processing unit 15 processes the digital image signals transmitted from the image detecting unit 14. The control unit 17 has a CPU as a main component, and can control both the image processing unit 15 and a display driver 18. Image data obtained by the image processing unit 15 is transmitted to the display driver 18, and an image is displayed on a display panel 19, such as a liquid crystal display panel provided in the vehicle.

Figure 4:
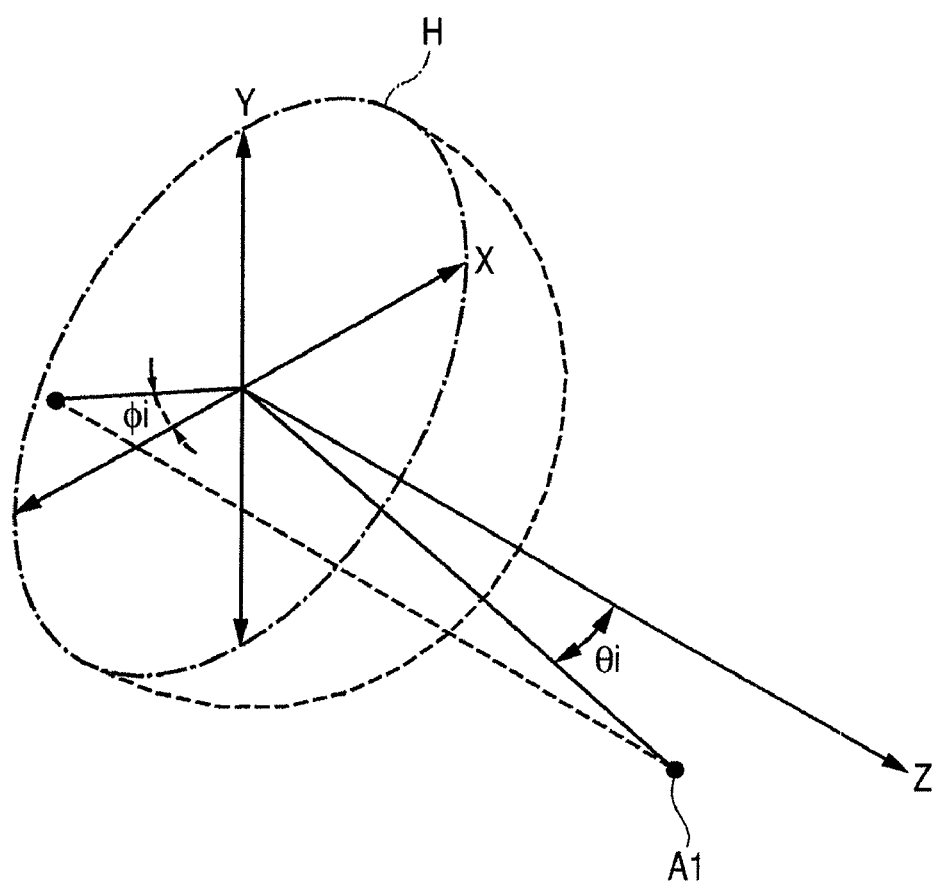
FIG. 4 is a diagram illustrating a spatial point, a zenith angle, and an azimuth angle.

FIG. 4 shows a plane H including an X-axis and a Y-axis that are orthogonal to each other, and a Z-axis that has an intersection of the X-axis and the Y-axis as the origin and extends vertically to the plane H. When the plane H is an imaging surface of the imaging device and a point A1 in front of the plane is a spatial point to be projected onto the imaging device, the zenith angle of the spatial point A1 with respect to the Z-axis is θi and the azimuth angle of the spatial point A1 from the X-axis is Φi.

FIG. 2B is a plan view illustrating the imaging device 13 provided in the fisheye camera 11. The general model of the fisheye lens is equidistant projection. When the image height of an image point A2 is 'ra' and the focal length thereof is 'f', ra=f·θi. Another model of the fisheye lens is equisolidangle projection in which ra=2f·sin(θi/2), and still another model thereof is orthogonal projection in which ra=f·sin θi.

These types of fisheye lenses can be represented by one model equation given below, using the image height ra as r(θi):

$$r(\theta i)=k_1\theta i+k_2\theta i^3+k_3\theta i^5+k_4\theta i^7+\ldots.$$

In this embodiment, a polynomial, which is the model equation of the fisheye lens from which an arbitrary high-order term is omitted, is stored in the memory 16. For example, the memory 16 stores the following polynomial:

$$r(\theta i)=k_1\theta i+k_2\theta i^3.$$

However, the degree of the polynomial may be arbitrarily set.

Figure 3:
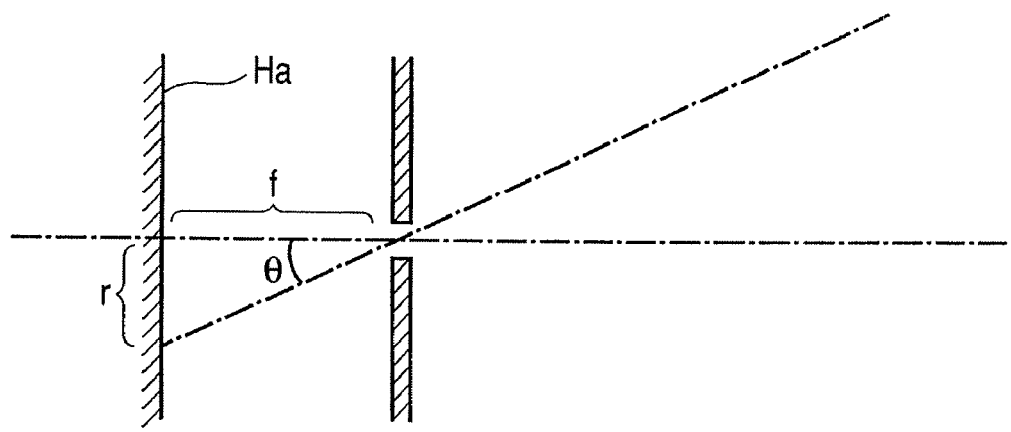
FIG. 3 is a diagram illustrating a central projection model.

FIG. 3 is a diagram illustrating central projection, which is a projection model using, for example, a theoretical convex lens without a pinhole or aberration. In the central projection, the image height r and the focal length f satisfy the following relationship:

$$r=f\cdot\tan\theta.$$

The model of the central projection shown in FIG. 3 can capture an image without any distortion, but has a small field angle capable of being projected onto an imaging device having a limited area. In contrast, the fisheye camera 11 using the fisheye lens 12 shown in FIGS. 2A and 2B can form a wide-angle image on the imaging device. For example, the field angle is approximately 180 degrees. However, as the field angle of the image formed on the imaging device 13 of the fisheye camera 11 is increased, the distortion of the image is increased.

Figure 5:
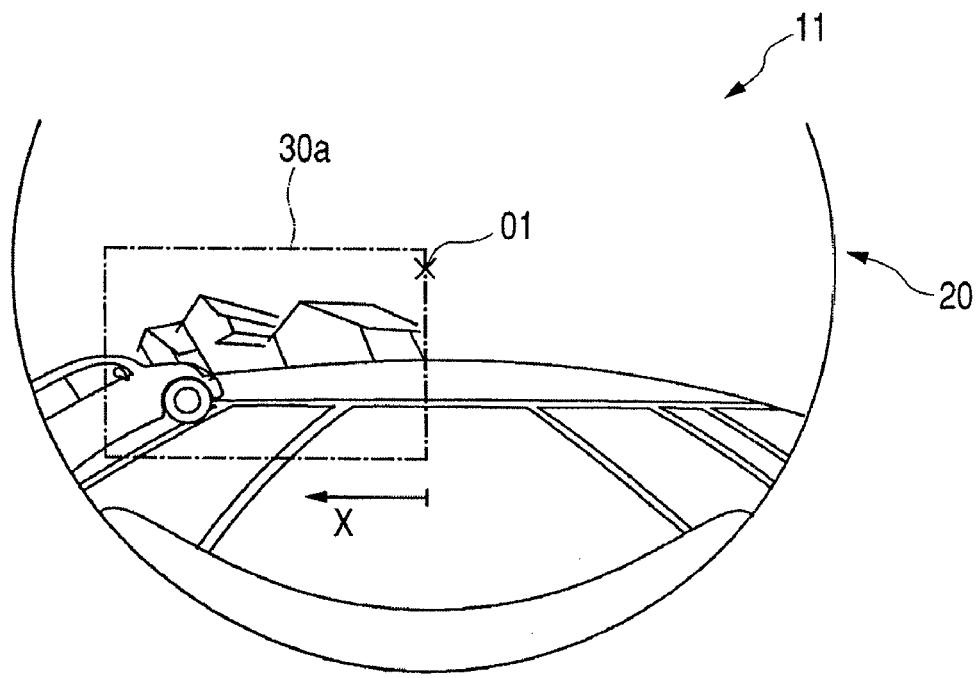
FIG. 5 is a diagram illustrating an example of the image captured by a fisheye camera.
Figure 6:
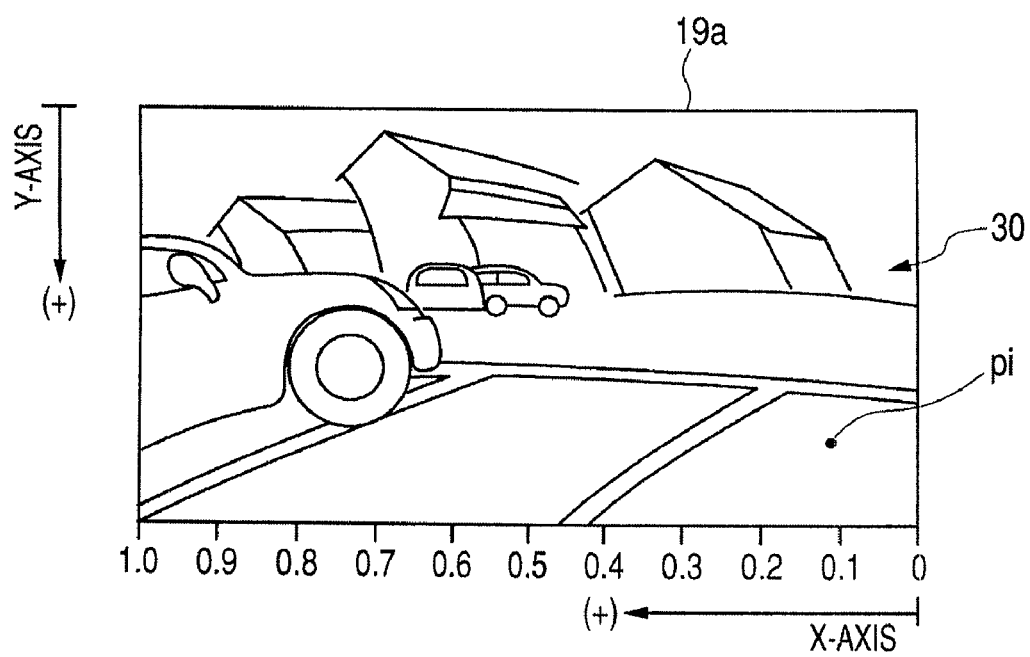
FIG. 6 is a diagram illustrating a display image, which is an enlarged image of a portion of the captured image.

FIG. 5 is a diagram illustrating an example of an image 20 formed on the imaging device 13 when the fisheye camera 11 captures an image. In FIG. 5, the position of the optical axis of the fisheye lens 12 is represented by a point O1. FIG. 6 is a diagram illustrating a display image 30 displayed on a screen 19a of a display panel 19. The display image 30 shown in FIG. 6 is an enlarged image of a section 30a, which is a portion of the captured image 20 shown in FIG. 5. The image 20 shown in FIG. 5 is formed by the fisheye lens 12. Therefore, as the distance from the optical axis O1 is increased, the amount of distortion of the image is increased. Therefore, the image processing unit 15 enlarges or reduces the field angle of the section 30a of the captured image 20 shown in FIG. 5 such that an enlargement ratio varies depending on the place, thereby correcting the distortion of the image, and generates image data for displaying the display image 30.

In this case, the enlargement ratio of the field angle varies depending on the distance from the optical axis O1. For example, the field angle of a region close to the optical axis O1 is increased. As the distance from the optical axis O1 is increased, the enlargement ratio is decreased or gradually reduced. Alternatively, as the distance from the optical axis O1 is increased, the enlargement ratio may be gradually increased.

This image processing makes it possible to increase the enlargement ratio of an interest region of an image to be displayed as the display image 30 or a region including necessary information and to gradually decrease the enlargement ratio of the field angle of the region as the distance from the region is increased.

Figure 7:
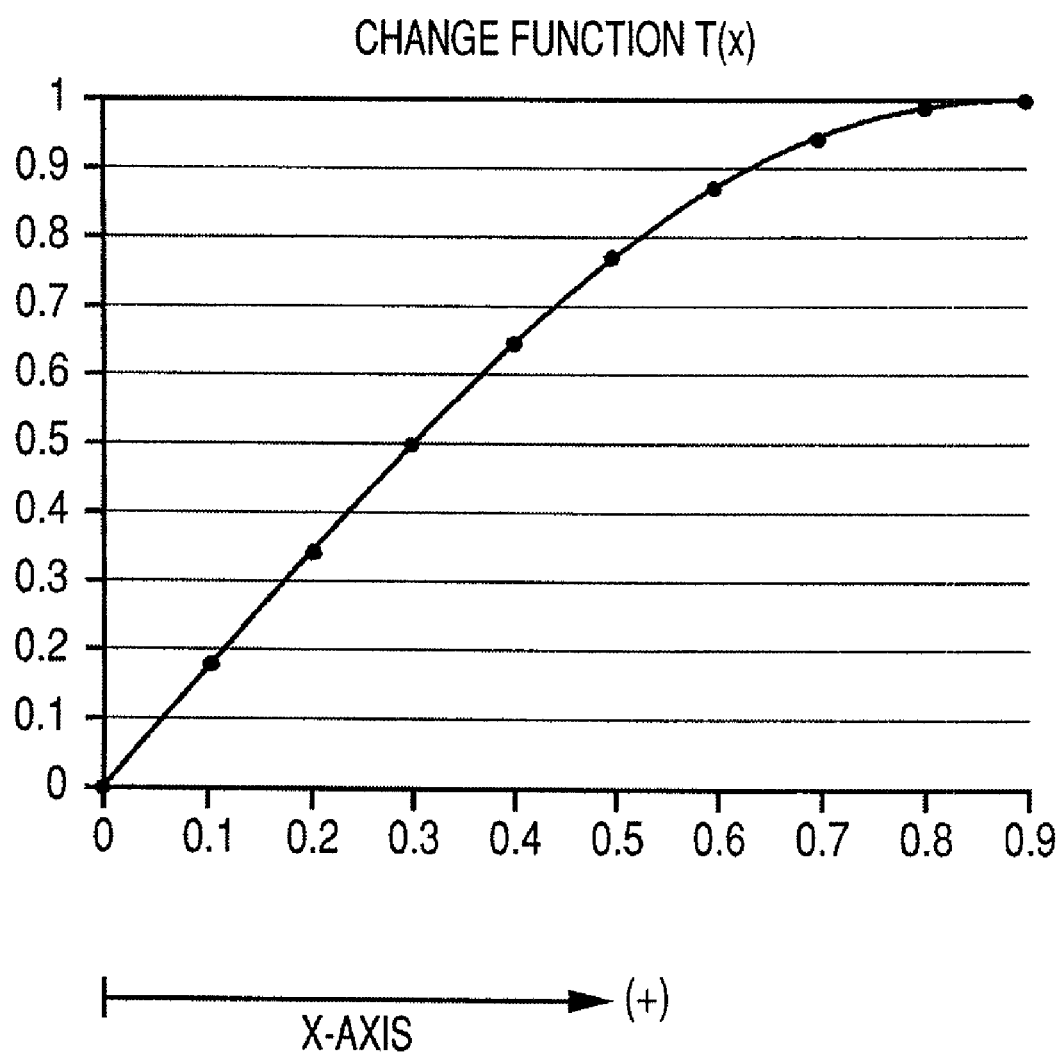
FIG. 7 is a diagram illustrating a change function T(x) in the X-axis direction.

In the example shown in FIG. 5, in a first image processing method of enlarging the section 30a, which is a portion of the captured image 20, to generate the display image 30, a change function T(x) of the field angle in the X-axis direction shown in FIG. 7 is used. The change function T(x) is predetermined in order to correct the processed image, and is stored in the memory 16.

In FIG. 6, the coordinates of the display image 30 in the X-axis direction are represented by 0, 0.1, 0.2, 0.3, . . . from the right to the left. In FIG. 7, the horizontal axis indicates the coordinates of the display screen 30 in the X-axis direction, and the vertical axis indicates a numerical value for enlarging the field angle of an image point disposed in the X-axis direction on the horizontal axis and processing the image point.

For example, the change function T(x) shown in FIG. 7 enlarges the field angle of information to be displayed at the X-axis coordinate '0.1' of the display screen 19a shown in FIG. 6 to the X-axis coordinate '0.18'. In addition, for example, the change function T(x) enlarges the field angle of information to be displayed at the X-axis coordinate '0.9' of the display screen 19*a* shown in FIG. 6 to the X-axis coordinate '1.0'.

Similarly, the memory 16 stores a change function T(y) of the field angle in the Y-axis direction. The change function T(y) of the field angle in the Y-axis direction has a different curvature from the change function T(x) of the field angle in the X-axis direction.

When the change functions T(x) and T(y) are used to perform image processing, it is possible to change the enlargement ratio of the field angle of an image depending on the place, and gradually change the direction in which the field angle of the image is enlarged, depending on the place.

The change function T(x) shown in FIG. 7 is a correction function that changes the enlargement ratio depending on the place, when the section 30*a*, which is a portion of the image 20 captured by the fisheye camera 11, is enlarged and displayed on the display screen 19*a* shown in FIG. 6. The use of the change function T(x) makes it possible to enlarge an interest region and generate a high-visibility display image 19*a* with little distortion. The change function T(x) is generated on the basis of the position, area, and enlargement ratio of the section 30*a*, which is a portion of the image 20 captured by the fisheye camera 11.

The change function T(x) is generated by determining the enlargement ratios of a plurality of points on the basis of the position, the area, and the enlargement ratio of the section 30*a*, which is a portion of the captured image 20, and linking points indicating the plurality of enlargement ratios into a parametric curve, such as a B spline curve. That is, the positional information of the plurality of enlargement ratios and a function of the parametric curve are stored in the memory 16. In this way, it is possible to store the change function T(x) shown in FIG. 7 in the memory 16.

The first image processing method is performed as follows. In the first image processing method, correspondences between the image signals (brightness signal) detected at the detection points of the imaging device 13 and the pixels Pi of the display screen 19*a* of the display panel 19 shown in FIG. 6 are determined.

First, the X-axis coordinate of the pixel Pi is substituted into the horizontal axis of the change function T(x) shown in FIG. 7 to calculate a normalized field angle αx. For example, if the X-axis coordinate of the pixel Pi is '0.1', '0.1' is substituted into the change function shown in FIG. 7 to obtain the X-axis coordinate '0.18'. The image processing unit 15 calculates a field angle in the X-axis direction corresponding to the X-axis coordinate '0.18'. The calculated value is the normalized field angle αx of the captured image.

In the example shown in FIG. 5, a point 0 of the section 30*a* on the X-axis is aligned with the position of the optical axis O1 in the X-axis direction. That is, the origin on the X-axis shown in FIG. 6 is the same as the X-axis coordinate of the optical axis O1. Therefore, in this example, the vertical axis shown in FIG. 7 means the enlargement ratio of the field angle. For example, when the pixel Pi is positioned at the x-axis coordinate '0.1', it is possible to calculate the normalized field angle αx of the captured image by multiplying the field angle at the x-axis coordinate '0.1' of the display screen 19*a* shown in FIG. 6 by 1.8. Similarly, it is possible to use the change function T(y) in the Y-axis direction to calculate the normalized field angle αy of the pixel Pi in the Y-axis direction. In the change function T(x) shown in FIG. 7, as the distance from the optical axis O1 is increased, the enlargement ratio of the field angle is gradually reduced.

Then, the positions rx and ry of a display point of the display image are calculated from a focal length f corresponding to the enlargement ratio of the display image, the field angle αx, and the field angle αy.

For example, the normalized field angles αx and αy of the captured image are used to calculate an image forming position on an image surface Ha in the central projection that does not follow the distortion shown in FIG. 3. In this process, the focal length f is obtained from a magnifying ratio corresponding to the overall enlargement ratio for displaying the section 30*a* of the captured image 20 shown in FIG. 5 as the display image 30 shown in FIG. 6. That is, it is possible to calculate the normalized coordinates rx and ry corresponding to the central projection of the pixel Pi from the following equation related to the central projection:

$rx = f \cdot \tan(\alpha x)$, and $ry = f \cdot \tan(\alpha y)$.

As described above, it is possible to find the zenith angle θi and the azimuth angle Φi shown in FIG. 4 by calculating the normalized coordinates rx and ry. The zenith angle θi and the azimuth angle Φi are the normalized zenith angle and azimuth angle corrected by the change function T(x) shown in FIG. 7, and are the zenith angle and the azimuth angle of a spatial point to be projected onto the Pixel Pi, respectively.

Then, the zenith angle θi and the azimuth angle Φi are substituted into the model equation of the fisheye lens 12 used for the fisheye camera 11 to calculate the image signal (brightness signal) of a detection point on the captured image 20 shown in FIG. 5 that is used as image data of the pixel Pi of the display screen 19*a*. The calculation method is performed as follows:

$r(\theta i) = k_1 \cdot \theta i + k_2 \cdot \theta i^3$, $mx = r(\theta i) \cdot \cos(\Phi i)$, and $my = r(\theta i) \cdot \sin(\Phi i)$.

$r(\theta i)(= k_1 \theta i + k_2 \theta i^3 + k_3 \theta i^5 + k_4 \theta i^7 + \ldots)$ may have any order as long as it is a polynomial in which an arbitrary high-order term is omitted.

The above-mentioned process is performed on all the pixels Pi of the display screen 19*a*.

In the above-mentioned first image processing method, the image formed on the imaging device 13 of the fisheye camera 11 is converted into a central projection image. In this way, it is possible to correct the distortion of the enlarged display image 30 shown in FIG. 6. However, when the wide-angle image data obtained by the imaging device 13 is just converted into a central projection image, a region close to the optical axis O1, which is an interest region of the image displayed on the display screen, is excessively reduced, and a region distant from the optical axis O1 is excessively enlarged. As a result, the visibility of the image is significantly lowered.

In contrast, in the above-mentioned image processing method, as shown in FIG. 7, a predetermined change function T(x) is used to calculate the normalized field angles αx and αy at a position corresponding to the pixel Pi, and the field angles αx and αy are used to calculate the zenith angle θi and the azimuth angle Φi from a central projection equation. Then, the zenith angle θi and the azimuth angle Φi are substituted into the model equation of the fisheye lens 12 to calculate the coordinates (mx, my) of a detection point on the captured image 20 to be projected to the pixel P1 of the display screen 19*a*.

The use of the change functions makes it possible to directly convert the image captured by the fisheye camera into a central projection image, and correct an excessively large region or an excessively small region to obtain the display image 30 with high visibility.

Figure 8:
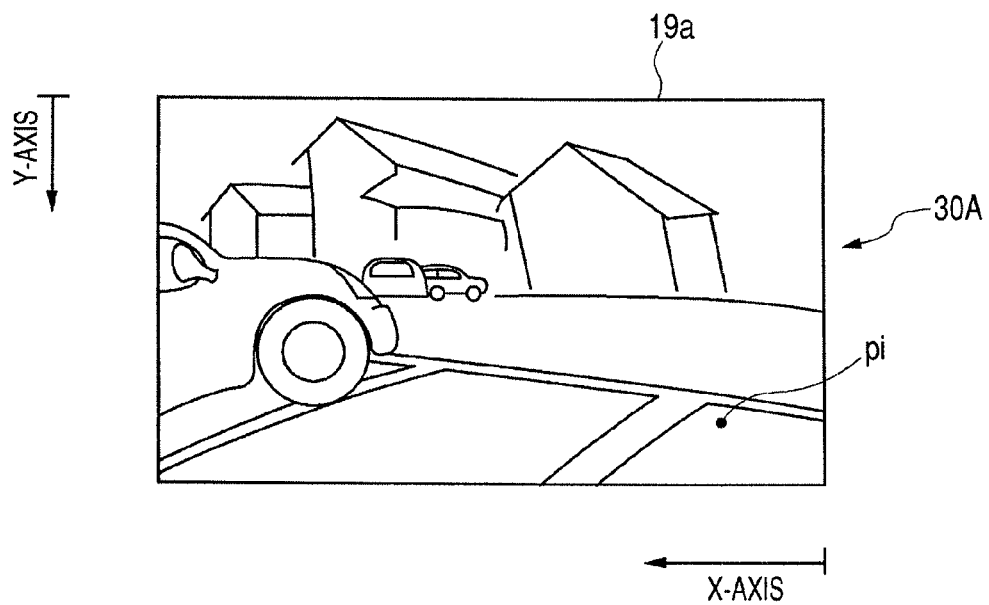
FIG. 8 is a diagram illustrating a display image whose aspect ratio is corrected.

A second image processing method is performed to obtain a uniform aspect ratio of an image, such as the display image 30A shown in FIG. 8, in the X-axis direction and the Y-axis direction at each point in a display region. It is possible to reduce the irregularity of a display image by correcting the aspect ratio of the entire display screen 19a to be constant.

The second image processing method uses the change function T(x) that determines an enlargement ratio in the X-axis direction, which is shown in FIG. 7, the change function T(y) that determines an enlargement ratio in the Y-axis direction, and a differential function T'(x) in the X-axis direction that is obtained by differentiating the change function T(x).

In the second image processing method, the positional information of the pixel Pi of the display screen 19a is substituted into the change function T(x) in the X-axis direction to calculate the normalized field angle αX in the X-axis direction, similar to the first image processing method.

In addition, the positional information of the pixel Pi is substituted into the change function T(y) in the Y-axis direction to calculate the normalized field angle αy in the Y-axis direction. However, the X-axis coordinate of the pixel is substituted into the differential function T'(x) to calculate a differential correction value. When the field angle of each pixel Pi in the Y-axis direction is calculated, the differential correction value at the X-axis coordinate of the pixel Pi is added to the field angle αy calculated by the change function T(y) to obtain a normalized field angle αy' after the aspect ratio is corrected. The differential correction value is obtained by multiplying the differential function T'(x) by a predetermined coefficient.

That is, the aspect ratio is corrected such that, as the amount of distortion in the X-axis direction is increased, the field angle in the Y-axis direction is increased. The obtained normalized field angles αx and αy' are used to calculate the coordinates rx and ry of an image point on the central projection image, and the coordinates (mx, my) of a detection point corresponding to the pixel Pi on the captured image 20 are calculated from the zenith angle θi and the azimuth angle Φi. This correction process makes it possible to obtain a display image 30A having a corrected aspect ratio shown in FIG. 8, not the distorted display image 30 with display irregularity shown in FIG. 6.

Figure 9A:
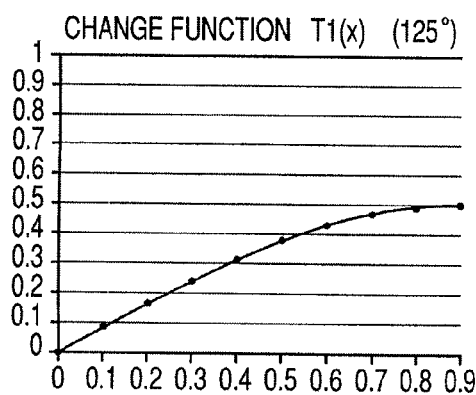
FIGS. 9A and 9B are change functions corresponding to field angles when enlargement ratios are different from each other.
Figure 9B:
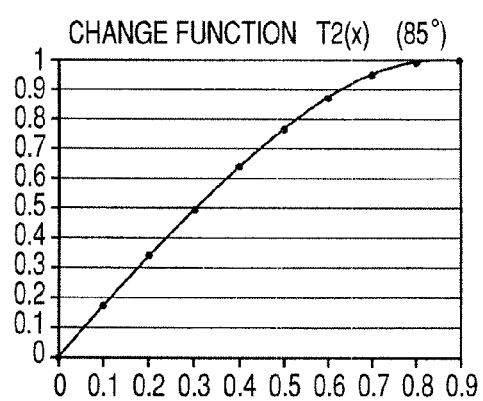

FIG. 9A shows a change function T1(x) when the field angle of the section 30a shown in FIG. 5 is in the range from the optical axis O1 to an angle of 125° in the X-axis direction, and FIG. 9B shows a change function T2(x) when the field angle of the section 30a is in the range from the optical axis O1 to an angle of 85° in the X-axis direction. An enlargement ratio for obtaining the display image 30 shown in FIG. 6 from the captured image 20 shown in FIG. 5 is higher at a field angle of 85° than at a field angle of 125°. In the change function T1(x) shown in FIG. 9A, since the field angle is 125°, which is a large angle, the field angle of a portion of the captured image 20 is reduced in the X-axis direction to generate the display image 30.

The memory 16 stores the change function T1(x) shown in FIG. 9A and the change function T2(x) shown in FIG. 9B. When a portion of the captured image 20 shown in FIG. 5 is enlarged to generate the display image 30 shown in FIG. 6, it is possible to display two types of images, that is, an image having a field angle of 125° and an image having a field angle of 85°. For example, when the fisheye camera 11 captures an image on the rear side of the vehicle in the oblique direction and the display image 30 is displayed on the display screen 19a provided in the vehicle, an operator in the vehicle changes the field angle to display an image appropriate to the conditions. Alternatively, when the imaging apparatus is mounted to the body of the vehicle, different enlargement ratios may be set to different types of vehicles before shipment.

The enlargement ratio may be changed by a simple switching process of switching the change function used for image processing between the change function T1(x) shown in FIG. 9A and the change function T2(x) shown in FIG. 9B and changing the focal length f when an image is converted into a central projection image.

In addition, a change function Tm(x) in the X-axis direction shown in FIG. 10 is stored in the memory 16. One change function Tm(x) may be used to change the enlargement ratio of the display image 30 (or 30A) displayed on the display screen 19a. For example, one kind of change function Tm(x) stored in the memory 16 may be used to perform switching between a display mode having a wide field angle of 125° and a display mode having a field angle of 85°.

That is, the change function Tm(x) in the X-axis direction shown in FIG. 10 is a combination of the change function T1(x) shown in FIG. 9A and the change function T2(x) shown in FIG. 9B. When the display image 30 having a wide field angle of 125° is obtained, the change function Tm(x) is used in a range (i) of FIG. 10 to determine a detection point on the captured image 20 corresponding to the pixel Pi, similar to the first image processing method or the second image processing method. When the display image 30 having a field angle of 85° is obtained, the change function Tm(x) is used in a range (ii) of FIG. 10 to determine a detection point on the captured image 20 corresponding to the pixel Pi, similar to the first image processing method or the second image processing method. A change function Tm(y) in the Y-axis direction is used by the same manner as described above.

FIGS. 11A, 11B, and 11C show examples in which the same type of change functions as the change functions shown in FIGS. 9A and 9B or the combined change function shown in FIG. 10 are used to display images on the display screen at three enlargement ratios.

FIG. 11A shows an enlarged display image 130A having a field angle range of 82° in the X-axis direction, FIG. 11B shows an enlarged display image 130B having a field angle range of 110° in the X-axis direction, and FIG. 11C shows an enlarged display image 130C having a field angle range of 140° in the X-axis direction.

In FIGS. 11A, 11B, and 11C, the field angles in the X-axis direction are different from each other, that is, the field angles are 82°, 110°, and 140°, but the front wheel of the vehicle is displayed substantially at the same position on the image displayed on the display screen 19a. This is achieved by adding an additional angle (Δαx) in the X-axis (+) direction to the normalized field angle αx corresponding to each pixel Pi calculated by the change function T(x) and increasing the absolute value of the additional angle (Δαx) as the field angle is decreased. The sum αx+Δαx of the field angle αx and the additional field angle (Δαx) and the normalized field angle αy in the Y-axis direction are used to calculate the coordinates rx and ry of an image height of the central projection, and the zenith angle θi and the azimuth angle Φi are used to calculate the coordinates (mx, my) of a detection point corresponding to the pixel Pi on the captured image 20. In this way, as shown in FIGS. 11A, 11B, and 11C, it is possible to generate the display images 130A, 130B, and 130C which are displayed at different enlargement ratios, but in which portions of the images having high enlargement ratios are displayed substantially at the same position on the display screen 19a.

The generation of the enlarged images shown in FIGS. 11A, 11B, and 11C makes it possible to reduce the display irregularity of a display image when the enlargement ratio of the image displayed on the display screen 19a is changed.

In the above-described embodiment, a camera using the fisheye lens is used as an example, but the invention is not limited thereto. For example, the invention may use a wide-angle lens that has a field angle of about 60° or more and generates visible distortion at the edge of a detected image. In the invention, the wide-angle lens includes the fisheye lens.

What is claimed is:

1. an imaging apparatus comprising: a lens;
an imaging device that detects light focused by the lens at a plurality of detection points;
and an image processing unit that generates image data for displaying an image on a display screen having a predetermined area, on the basis of image signals detected at the detection points of the imaging device,
wherein the image processing unit performs image processing to enlarge a section, which is a portion of the image captured by the imaging device, and displays the enlarged image on the display screen, and in the image processing, an enlargement ratio of a field angle varies depending on the place in the section,
wherein, in the image processing, the enlargement ratio of the field angle in an X-axis direction corresponding to a horizontal axis of the display screen, and the enlargement ratio of the field angle in a Y-axis direction that is orthogonal to the X-axis direction are changed on the basis of a predetermined change function, and
wherein, in the image processing, the following processes are performed on each pixel Pi of the display screen, and a process of making the pixels Pi correspond to image signals of the detection points of the imaging device is performed:
(1) a process of substituting the X-axis coordinate of the pixel Pi on the display screen into the change function to calculate a field angle αx in the X-axis direction corresponding to the coordinate and substituting the Y-axis coordinate of the pixel Pi on the display screen into the change function to calculate a field angle αy in the Y-axis direction corresponding to the coordinate;
(2) a process of calculating the positions rx and ry of an image point of a display image on the basis of a focal length f corresponding to the enlargement ratio of the display image, the field angle αx, and the field angle αy;
(3) a process of calculating a zenith angle θi and an azimuth angle Φi of a spatial point to be projected onto the pixel Pi on the basis of the positions rx and ry;
(4) a process of making the pixel Pi correspond to the image signal detected at any one of the detection points of the imaging device on the basis of the zenith angle θi, the azimuth angle Φi, and a projection polynomial of the lens; and
(5) a process of performing the processes (1) to (4) on all the pixels of the display screen.

2. The imaging apparatus according to claim 1,
wherein, in the image processing, the enlargement ratio of a field angle varies depending on the place in the section, and a direction in which the field angle is enlarged is changed.

3. The imaging apparatus according to claim 1,
wherein, in the imaging process, as the distance from the optical axis of the lens is increased, the enlargement ratio of the field angle of the section is gradually changed.

4. The imaging apparatus according to claim 1,
wherein, in the imaging process, the field angle of an interest region of the image is enlarged, and the field angles of the other regions are reduced.

5. The imaging apparatus according to claim 1,
wherein the process (2) is performed by the equations given below:

$rx = f \cdot \tan(\alpha x)$, and $ry = f \cdot \tan(\alpha y)$.

6. The imaging apparatus according to claim 1,
wherein, in the process (4), the coordinates (mx, my) of a detection point corresponding to the pixel Pi on the imaging device are calculated by equations given below:

$r(\theta i) = k_1 \theta i + k_2 \theta i^3 + k_3 \theta i^5 + k_4 \theta i^7 + \ldots$, $mx = r(\theta i) \cdot \cos(\Phi i)$, and $my = r(\theta i) \cdot \sin(\Phi i)$ (where r(θi) is calculated by an arbitrary order polynomial).

7. The imaging apparatus according to claim 1,
wherein one of the enlargement ratio in the X-axis direction and the enlargement ratio in the Y-axis direction is determined on the basis of a predetermined change function, and the other enlargement ratio is determined on the basis of a change function following a correction value of an aspect ratio.

8. The imaging apparatus according to claim 7,
wherein a correction function is obtained from a differential function of the one change function.

9. The imaging apparatus according to claim 1,
wherein, even when the enlargement ratio of the image captured by the imaging device is different from the enlargement ratio of a display image displayed on the display screen, a common change function is used.

10. The imaging apparatus according to claim 1,
wherein a display image is displayed on the display screen such that the enlargement ratio of the image captured by the imaging device and the enlargement ratio of the display image displayed on the display screen are changed.

11. The imaging apparatus according to claim 1,
wherein a display image is displayed on the display screen such that the enlargement ratio of the image captured by the imaging device and the enlargement ratio of the display image displayed on the display screen are changed, and
an adjustment angle for adjusting the central position of the field angle is added to the change function.

* * * * *